US006219831B1

United States Patent
Ono

(12) United States Patent
(10) Patent No.: US 6,219,831 B1
(45) Date of Patent: Apr. 17, 2001

(54) DEVICE AND METHOD FOR CONVERTING COMPUTER PROGRAMMING LANGUAGES

(75) Inventor: Shiegeichi Ono, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/105,839

(22) Filed: Aug. 12, 1993

(30) Foreign Application Priority Data

Aug. 12, 1992 (JP) .................................................. 4-215032

(51) Int. Cl.[7] ...................................................... G06F 9/45
(52) U.S. Cl. ...................................................... 717/5; 717/7
(58) Field of Search ...................................... 395/700, 500; 364/280.4, 973; 717/5, 7

(56) References Cited

U.S. PATENT DOCUMENTS

| | | | |
|---|---|---|---|
| 4,374,408 | * | 2/1983 | Bowles et al. ............................ 717/7 |
| 4,667,290 | * | 5/1987 | Goss et al. ................................ 717/7 |
| 4,712,189 | * | 12/1987 | Mohri ........................................ 717/5 |
| 4,864,503 | * | 9/1989 | Tolin ........................................ 704/2 |
| 4,916,610 | * | 4/1990 | Bapat ........................................ 717/8 |
| 4,989,145 | * | 1/1991 | Kyushima ................................ 704/9 |
| 5,023,786 | * | 6/1991 | Kugimiya et al. ....................... 704/4 |
| 5,101,491 | * | 3/1992 | Katzeff .................................... 703/22 |
| 5,117,349 | * | 5/1992 | Tirfing et al. ............................ 707/3 |
| 5,230,049 | * | 7/1993 | Chang et al. ............................. 717/8 |
| 5,280,617 | * | 1/1994 | Brender et al. .......................... 717/3 |
| 5,295,070 | * | 3/1994 | Justice ...................................... 704/2 |
| 5,586,330 | * | 12/1996 | Knudsen et al. ......................... 717/5 |

\* cited by examiner

*Primary Examiner*—Kenneth R. Coulter
(74) *Attorney, Agent, or Firm*—Lawrence D. Cutter

(57) ABSTRACT

When model statements in an origin language, model statements in a target language, and conversion rules for word (variable) sections are inputted from the screen of a conversion rule input means, a conversion rule generation means generates a conversion rule according to this input and stores it in the conversion rule database. The conversion rule is composed of a search key, a word conversion direction section, and a target language generation program. The search key is used when a conversion rule needed for the conversion of an unconverted origin program is searched for in a database and fetched, the word conversion direction section is used for calling the word conversion table or the word conversion program, and the target language generation program is used for generating a converted target program. The conversion rule input means, conversion rule generation means, and conversion rule drive means do not depend on the origin language and target language of the languages involved in conversion. The object is to provide a highly versatile device and method for converting programming languages that can be applied to program conversion between many computer programming languages.

15 Claims, 16 Drawing Sheets

```
IF (X) 100, 200, 300       ─81  ⎤
TITLE (1) = HEAD (1)  ⎤          ⎬ FORTRAN
TITLE (2) = HEAD (2)  ⎬ 82       ⎦
TITLE (3) = HEAD (3)  ⎦
MOVE AREA, (8, #2), (16, BYTE) ─83  ⎤
MOVE AREA, C' ',(32, BYTE) ─84      ⎬ EDL (EVENT DRIVEN LANGUAGE)
MOVE XAREA, YAREA ─85               ⎦
```

```
IF X<0 PERFORM L100  ⎤─91
IF X=0 PERFORM L200  ⎬ COBOL
IF X>0 PERFORM L300  ⎦
MOVE COBOL-HEAD TO COBOL-TITLE.  ⎬ COBOL   92
MEMCPY(AREA, ((CHAR*)REG_2+8), 16);  ⎤
MEMSET(AREA,' ', 32); ─94             ⎬ C LANGUAGE   93
XAREA=YAREA; ─95                      ⎦
```

```
IF (*A) *N1, *N2, *N3        } ORIGIN LANGUAGE
                               INPUT SECTION 31

*N1 LABEL *XL1           }
    *N2 LABEL *XL2             WORD CONVERSION
    *N3 LABEL *XL3             INPUT SECTION 32

IF *A < 0 PERFORM *XL1.      }
IF *A = 0 PERFORM *XL2.        TARGET LANGUAGE
IF *A > 0 PERFORM *XL3.        INPUT SECTION 33
```
30

FIG.10

```
!*TO(*I) = *FROM(*I)         }
!*TO(*J) = *FROM(*J)           ORIGIN LANGUAGE
!*TO(*K) = *FROM(*K)           INPUT SECTION 31

*I RELATION *J           }
    *J RELATION *K             WORD CONVERSION
    *TO NAME *COBOLX           INPUT SECTION 32
    *FROM NAME *COBOLY

MOVE *COBOLY TO *COBOLX      } TARGET LANGUAGE
                               INPUT SECTION 33
```

FIG.11

```
MOVE *V1, (*V2, *R), (*L, BYTE)              } ORIGIN LANGUAGE
                                               INPUT SECTION 31

*V1 LOWERCASE *V1S                           } WORD CONVERSION
*R  REGISTER  *RS                              INPUT SECTION 32

MEMCPY(*V1S, ((CHAR*) *RS + V2), *L) ;       } TARGET LANGUAGE
                                               INPUT SECTION 33
```
30

FIG.12

```
MOVE *V1, C' ', (*L, BYTE)                   } ORIGIN LANGUAGE
                                               INPUT SECTION 31

*V1 LOWERCASE *V1S                           } WORD CONVERSION
                                               INPUT SECTION 32

MEMSET(*V1S,' ', *L);                        } TARGET LANGUAGE
                                               INPUT SECTION 33
```
30

FIG.13

```
MOVE *V1, *V2           } ORIGIN LANGUAGE
                          INPUT SECTION 31

*V1 LOWERCASE *V1S      } WORD CONVERSION
*V2 LOWERCASE *V2S        INPUT SECTION 32

*V1S = *V2S;            } TARGET LANGUAGE
                          INPUT SECTION 33
```
30⏌

FIG.14

CONVERSION RULE SEARCH KEY

```
CONVERT (["IF", "(", A, ")", N1, ",",N2, ",",N3])        }
      <- TABLE (LABEL, N1, XL1) ]
       & TABLE (LABEL, N2, XL2)  } WORD CONVERSION
       & TABLE (LABEL, N3, XL3) ]  DIRECTION SECTION
       &  Z1 := 'IF '||A||' < 0 PERFORM '||XL1||'.'  ]
       &  Z2 := 'IF '||A||' = 0 PERFORM '||XL2||'.'  }
       &  Z3 := 'IF '||A||' > 0 PERFORM '||XL3||'.'  ]
       &  PRST(Z1, OUT) & N1 (OUT)
       &  PRST(Z2, OUT) & N1 (OUT)   TARGET LANGUAGE
       &  PRST(Z3, OUT) & N1 (OUT)   GENERATION SECTION
                                     (PROGRAM)
```
99⏌

FIG.15

```
CONVERT ( [ TO , "(", I, ")","=",FROM, "(", I, ")"] ,
         [ TO , "(", J, ")","=",FROM, "(", J, ")"] ,
         [ TO , "(", K, ")","=",FROM, "(", K, ")"] )
```
⎫ CONVERSION RULE SEARCH KEY

```
    <- TABLE (RELATION, I, J)
     & TABLE (RELATION, J, K)
     & TABLE (NAME, TO, COBOLX)
     & TABLE (NAME, FROM, COBOLY)
```
⎫ WORD CONVERSION DIRECTION SECTION

```
     & Z1 := 'MOVE '||COBOLY||' TO '||COBOLX||'.'
     & PRST(Z1, OUT) & N1 (OUT)
```
⎫ TARGET LANGUAGE GENERATION SECTION (PROGRAM)

```
CONVERT ( ["MOVE",V1,",","(",V2,",",R,")",",",",","(",L,",","BYTE",")"]) 
```
⎫ CONVERSION RULE SEARCH KEY

```
    <- TABLE (LOWERCASE,V1,V1S)
     & TABLE (REGISTER,R,RS)
```
⎫ WORD CONVERSION DIRECTION SECTION

```
     & Z1 := 'MEMCPY('||V1S||', ((CHAR*)'||RS||'+'||V2||'),
             ||L||');'
     & PRST(Z1, OUT) & N1 (OUT).
```
⎫ TARGET LANGUAGE GENERATION SECTION (PROGRAM)

FIG.17

```
TABLE (LABEL,N,XL) <- XL := 'L'||N          % WORD CONVERSION LOGIC
TABLE (RELATION,I,J) <- st_to_at(Si,I) & st_to_nb(Si,Ni)
                     & st_to_at(Sj,J) & st_to_nb(Sj,Nj)
                     & Nj := Ni + 1.
TABLE (LOWERCASE,X,Y) <- st_to_at(S,X)
                      & Y:= LOWER(S).
TABLE (NAME    ,"HEAD" , "COBOL-HEAD").     % WORD CONVERSION TABLE
TABLE (NAME    ,"TITLE" , "COBOL-TITLE").
TABLE (REGISTER ,"#1",REG_1).
TABLE (REGISTER ,"#2",REG_2).
```

```
DATA(1,["IF","(","X",")","100",",","200",",","300"]).   ←21a
DATA(2,["TITLE","(","5",")","=","HEAD","(","5",")"]).  ⎤
DATA(3,["TITLE","(","6",")","=","HEAD","(","6",")"]).  ⎬─21b
DATA(4,["TITLE","(","7",")","=","HEAD","(","7",")"]).  ⎦
DATA(5,["MOVE","AREA",",","(","8",",","#2",")",",",    ⎫─21c
        "(","16",",","BYTE",")"]).                      ⎭
DATA(6,["MOVE","AREA",",","C' ' ","(","32",",","BYTE",")"]). ←21d
DATA(7,["MOVE","XAREA",",","YAREA"]). ←21e
```

```
DRIVER
    <-DEFIO(ADD,OUT,OUTPUT,FILE,'SAMPLE.MIX.A',[RECFM=F,1RECl=80])
      & COMPUTE(LIST,M,DATA(M,*),[],LIST)
      & DRIVER(LIST)
      & DEFIO(CLOSE,OUT).
DRIVER (M1,M2,M3!LIST])
    <-DATA(M1,LIST1)
      & DATA(M2,LIST2)
      & DATA(M3,LIST3)
      & CONVERT(LIST1,LIST2,LIST3)
      & DRIVER(LIST).
DRIVER (M1,M2!LIST])
    <-DATA(M1,LIST1)
      & DATA(M2,LIST2)
      & CONVERT(LIST1,LIST2)
      & DRIVER(LIST).
DRIVER(M1!LIST])
    <-DATA(M1,LIST1)
      & CONVERT(LIST1)
      & DRIVER(LIST).
DRIVER(M1!LIST])
    <-DATA(M,LIST)
      & RULE_GEN(LIST1)
      & DRIVER(LIST).
DRIVER([]).
```

DEVICE AND METHOD FOR CONVERTING COMPUTER PROGRAMMING LANGUAGES

BACKGROUND OF THE INVENTION

This invention is related to a device and method for converting computer programming languages, and particularly, to a highly versatile device and method for converting computer programming languages that can be used for converting programs between a number of computer programming languages without being limited to conversion of programs between two specific programming languages.

A program that gives a job procedure to a computer is written in computer programming language (programming language). There are many computer programming languages. When viewed in terms of language level, there are languages that are directly dependent on the computer, which are called machine languages, and languages that are much closer to human languages, which are called high-level languages. When viewed in terms of language application, there is FORTRAN, which is a scientific computation-oriented language and COBOL, which is a business-oriented language. Some languages are developed for specific computers by specific laboratories or enterprises. In recent years, there have been general-user-oriented languages, called 4th generation languages, that are closer to the applications. In addition, there may be several different dialects because of differences in level, even in the same types of language. There are many cases where a program written in a computer programming language (e.g., FORTRAN) must be converted into a program written in another computer programming language (e.g., COBOL). This situation arises when it is desired to run a program written in a language for a certain computer on another computer and there is a need to rewrite that program into a language for the other different computer.

Therefore, a device for converting computer programming languages that converts programs between different computer languages (hereinafter, the unconverted language is called the original language and the converted language is called the target language) is needed. Here, conversion means to change the program from one language (original language) into another language (target language).

Many computer programming language converters have been proposed in the past. The problem of the conventional computer programming language converters is that it is necessary to modify the built-in converter program even if only the level of the unconverted original language is changed, because the conversion method between the different languages in the converter built-in program is fixed. Furthermore, it is necessary to closely investigate the differences between the unconverted original language and the converted target language at the stage of making a converter. Besides this, it takes a tremendous amount of time to make a programming language converter because all the specifications will be different in conversion between different languages, for example, between FORTRAN and COBOL, or between application languages called 4th generation languages. Furthermore, engineers who know both the unconverted original language and the converted target language well are needed to make a programming language converter, but these kinds of engineers cannot be obtained easily.

A programming language translator, for example, such as is disclosed in PUPA No. 2-10434, has been proposed in the past to solve this kind of problem. This is for providing a comparison table of basic syntax (instruction statements) between original language and target language, for analyzing the unconverted program syntax, and for selecting an appropriate basic syntax for the target language from the table. In this translator disclosed in PUPA No. 2-10434, making use of a new original language and the target language only requires storing that new basic syntax in the table. However, the basic syntax in this table stores sections expressing those functions, for example, the GO TO section (hereafter called key words), and variable sections, for example, (hereafter called word) together. For the conversion into the target language in the corresponding table, the key words of the basic syntax and words are converted together. Therefore, in this conventional translator example, since key words and words are dealt with as one set and converted together, it is impossible to convert words themselves according to independent rules. This means it lacks versatility as a programming language translator.

In addition, in PUPA No. 2-183339, another conventional example, a method to obtain versatility in a computer programming language converter by incorporating lexical analysis and syntax analysis as independent routines not based on the original language and target language is proposed. However, there is also no suggestion in this conventional example about a method to provide a computer programming language converter with higher versatility by separating the instruction statements into a key word section expressing functions and a word section expressing variables for conversion, and by carrying out these conversions independently.

SUMMARY OF THE INVENTION

Problems to be Solved by the Invention

Therefore, an object of this invention is to provide a device and method for converting computer programming languages that have much higher versatility than conventional ones, and which can convert programs between many more computer programming languages. According to this invention, conversion rules are generated automatically when an operator inputs a conversion model on the computer input screen that converts from a model statement of an original language to a model statement of a target language. At this time, a device and method for converting computer programming languages which have high versatility, which can give instructions to convert key words expressing functions and words expressing variables in the instruction statements according to separate rules are provided.

Means for Solving the Problems

This device for converting computer programming languages of the invention has a conversion rule input means, a conversion rule generation means, and a conversion rule drive means. The conversion rule input means has an original language input section that describes and inputs modelled instruction statements in the original language in which the unconverted program is written according to the syntax of the original language, a target language input section that describes and inputs modelled instruction statements in the post-conversion target language, which perform the functions of the instruction statements in the original language, and a word conversion input section that describes and inputs the rules to convert individual variables, that is, words, that form the instruction statements in the original language into variables of the instruction statements in the target language.

The conversion rule generation means generates a conversion rule search key by using the input model statements that were inputted in the original language input section, generates a word conversion table or a word conversion program call function by using the rules that were inputted in the word conversion input section, generates a target language generation program by using the output model statements that were inputted in the target language input section, and generates a conversion rule taking these as a set. This conversion rule is stored in the conversion rule database.

When an unconverted original program is inputted, the conversion rule drive means analyzes the original program and fetches conversion rules to convert the instruction statements in original language from the conversion rule database by using a conversion rule search key. The conversion rule drive means further converts the words of the unconverted instruction statements into the words of the instruction statements of the converted program by using a word conversion table call function that is contained in the fetched conversion rule, and further, generates and outputs instruction statements in the converted target language by using a target language generation program that is also contained in the conversion rule.

According to this invention, the language conversion of programs can be executed by inputting original language model statements, target language model statements, and word (variable) section conversion rules using the conversion rule input means, by creating conversion rules by the conversion rule generation means based on this input, and by storing them in the conversion rule database. In this way, the model statements in the original language can be described by any programmer of the original language and this can be inputted by the conversion rule input means. In addition, programmers of the target language can describe it in the model statements of the target language through an understanding of the functions of the model statements, and this can be inputted together with the conversion rules for the word sections by the conversion rule input means. Therefore, conversion rules able to convert the word sections independently and conversion rules for the instruction statements can be generated at the same time. In addition, it is not necessary to generate all the conversion rules required for conversion from an original language into a target language at one time. It can be made so that conversion rules that are needed when converting from an original program into a target program are generated as occasion demands. Therefore, when a certain number of programs are converted, the conversion rules needed for conversion from an original language into a target language are stored in the conversion rule database.

According to this invention, conversion is provided when the conversion rule drive means analyzes a program written in an original language for each instruction or for each instruction group, collates these instructions or instruction groups with the model statements in the original language of the conversion rules stored in the conversion rule database, searches for ones that agree, and takes out programs to create model statements in a target language corresponding to those instruction statements or instruction groups. At this time, the table or program call function to convert the word sections is also taken out similarly from the conversion rule, and words are converted by using the word conversion table.

According to this invention, in principle, the conversion rule input means, conversion rule generation means, and conversion rule drive means do not depend on the types of the original languages and target languages. Therefore, the versatility of this device of the invention for converting programming languages is very high. This invention is explained based on the embodiment below, by referring to the drawings.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 8 is a drawing showing an example of an unconverted original program;

FIG. 9 is a drawing showing an example of a converted target program;

FIG. 10 is a drawing showing an example of a conversion rule input screen;

FIG. 11 is a drawing showing another example of a conversion rule input screen;

FIG. 12 is a drawing showing yet another example of a conversion rule input screen;

FIG. 13 is a drawing showing a still further example of a conversion rule input screen;

FIG. 14 is a drawing also showing an example of a conversion rule input screen;

FIG. 15 is a drawing showing another example of a conversion rule;

FIG. 16 is a drawing showing yet another example of a conversion rule;

FIG. 17 is a drawing showing a still further example of a conversion rule;

FIG. 20 is a drawing showing word conversion tables and word conversion logic;

FIG. 21 is a drawing showing an intermediate file of an unconverted original program;

FIG. 22 is a drawing showing a conversion rule drive program of a conversion rule drive means.

DETAILED DESCRIPTION OF THE INVENTION

Figure 1:
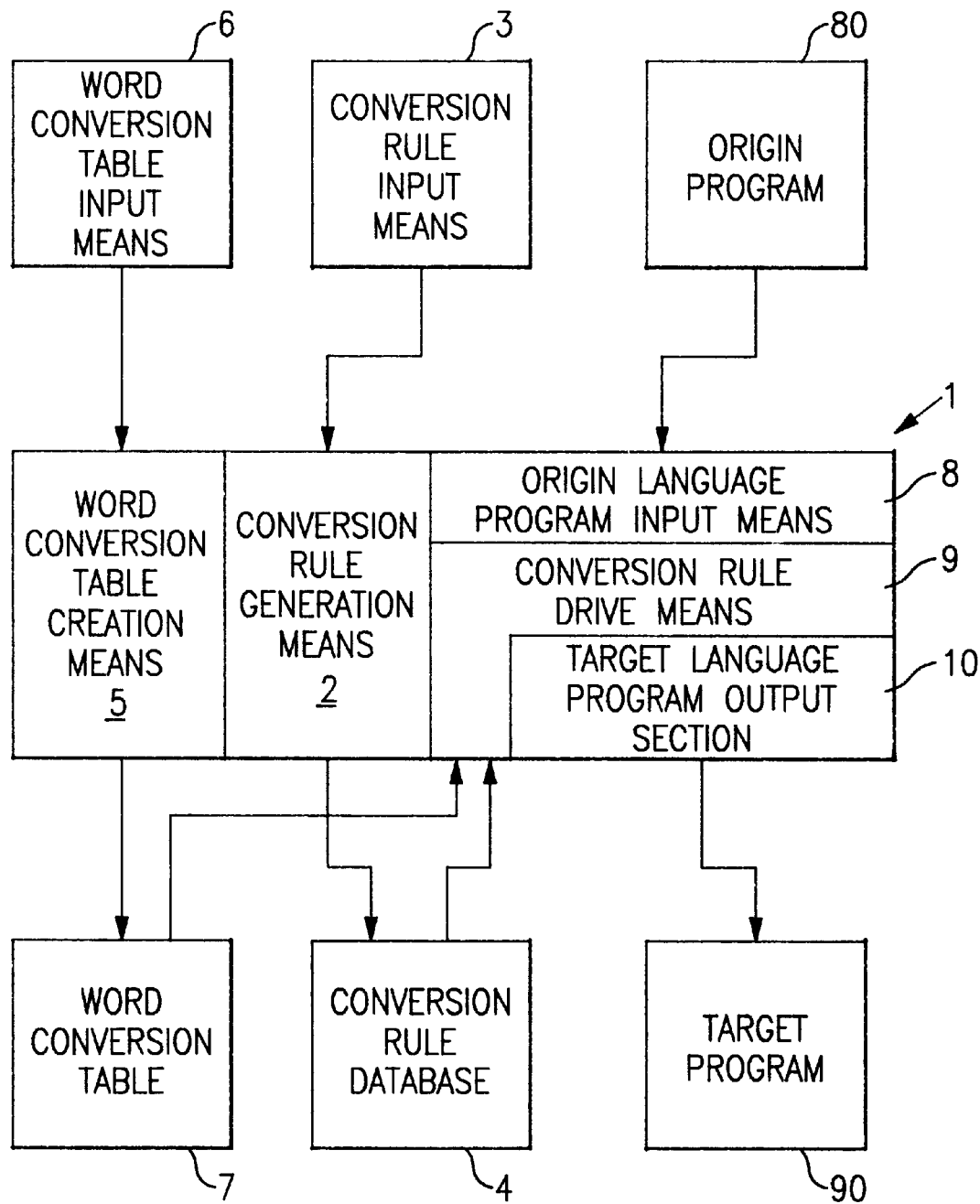
FIG. 1 is a schematic block diagram showing a device for converting computer programming languages according to an embodiment of this invention.

FIG. 1 is a block diagram illustrating a schematic configuration of general-purpose computer programming language converter 1, which is an embodiment of the present invention. Converter 1 has conversion rule generation means 2. Conversion rule generation means 2 is connected to a conversion rule input means 3, and generates conversion rules according to input from conversion rule input means 3. Generated conversion rules are stored in conversion rule database 4. Word conversion table creation means 5 creates word conversion table 7 according to input from word conversion table input means 6. An original language program input means 8 inputs an unconverted original program 80 and carries out preprocessing before conversion, such as analysis. Conversion rule drive means 9 searches conversion rules database 4 for conversion rules corresponding to the inputted original program, fetches them, and converts into target program 90 according to the conversion rules. In addition, conversion rule drive means 9 calls word conversion table 7 according to the same conversion rules as mentioned above and carries out word conversion between an original program 80 and the target program 90. The converted program is outputted from target language program output section 10 and target program 90, that has been converted into target language, is formed.

Figure 2:
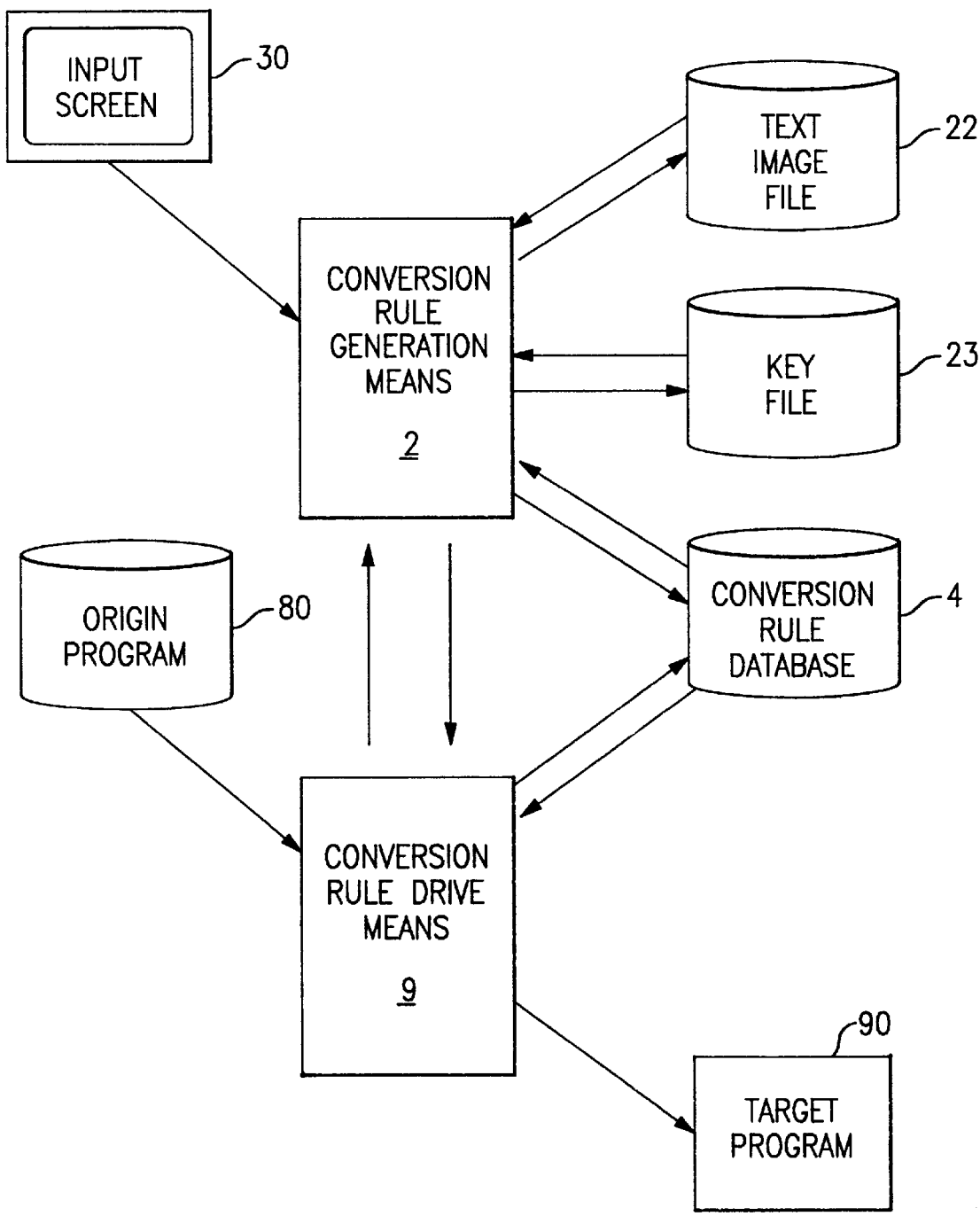
FIG. 2 is a schematic block diagram showing the generation and use of the conversion rules of this embodiment.

Next, the generation of conversion rules that is used in converter 1 is explained below. As shown in FIG. 2, conversion rule generation means 2 is connected to a user interface that provides input screen 30 for conversion rule input means 3, conversion rule text image file 22, conversion rule search key file 23, and conversion rule database 4. Conversion rule drive means 9 fetches conversion rules by accessing conversion rule database 4 by using conversion rule search key file 23 when original program 80 is converted into target program 90. Conversion rules are generated before conversion from original program 80 into target program 90 is carried out, but necessary conversion rules can also be generated during conversion. This is done by calling conversion rule generation means 2 from conversion rule drive means 9 at times when there is no appropriate conversion rule during conversion, as explained later. Conversion rule text image file 22 is used for maintenance of conversion rules, as explained later.

Figure 3:
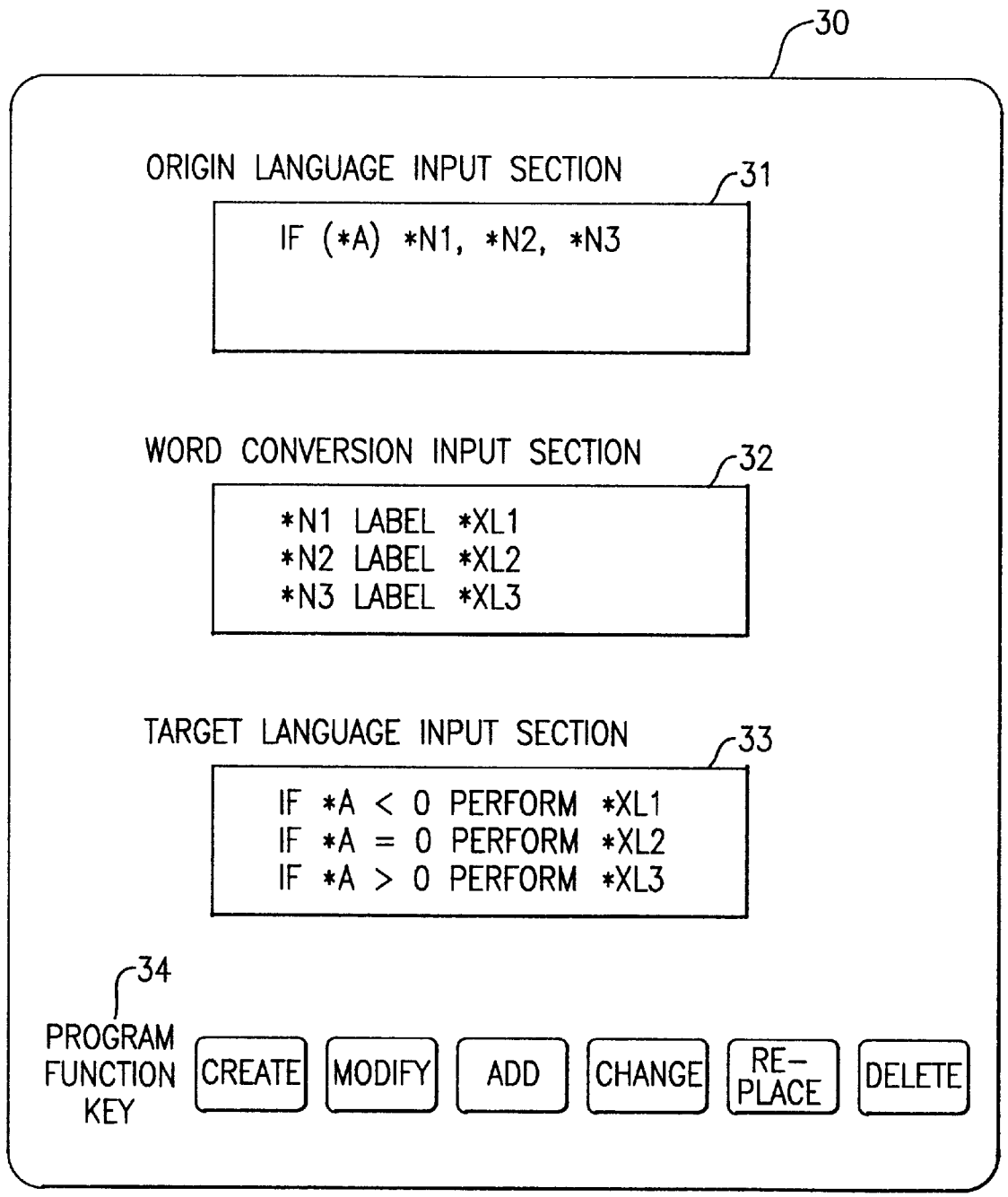
FIG. 3 is a drawing showing the conversion rule input screen of the conversion rule input means of this embodiment.

Screen 30 of conversion rule input means 3 provides an initialization input screen and a conversion rule input screen. The initialization input screen specifies an original language subject to conversion, and a target language. For example, conversion from COBOL for system A into COBOL for system B, or conversion from FORTRAN to COBOL, etc. FIG. 3 shows a conversion rule input screen 30. Users can also input, modify, or give directions, such as delete or change, from this computer input screen when a rule is established. Computer input screen 30 has, from the top original language input section 31, word conversion input section 32, and target language input section 33, and at the lower section of the screen, program function keys 34 that direct the after-input process, such as to create a new conversion rule, or modify existing rule, or add, delete, change, or replace a rule. The program accompanying this screen 30 is also provided with a function to edit inputted text.

A rule inputted on conversion rule input screen 30 is stored in the conversion rule text image file 22 in a form similar to its input form. This is done so that the conversion rule can be easily displayed again on screen 30 for later maintenance of a conversion rule.

A conversion rule search key is stored in conversion rule search key file 23. This search key is converted so that the original language sections of the inputted conversion rules can be easily searched with the programming language used in this embodiment, PROLOG. In this embodiment, this converted original language section is called the internal form for searching.

Figure 4:
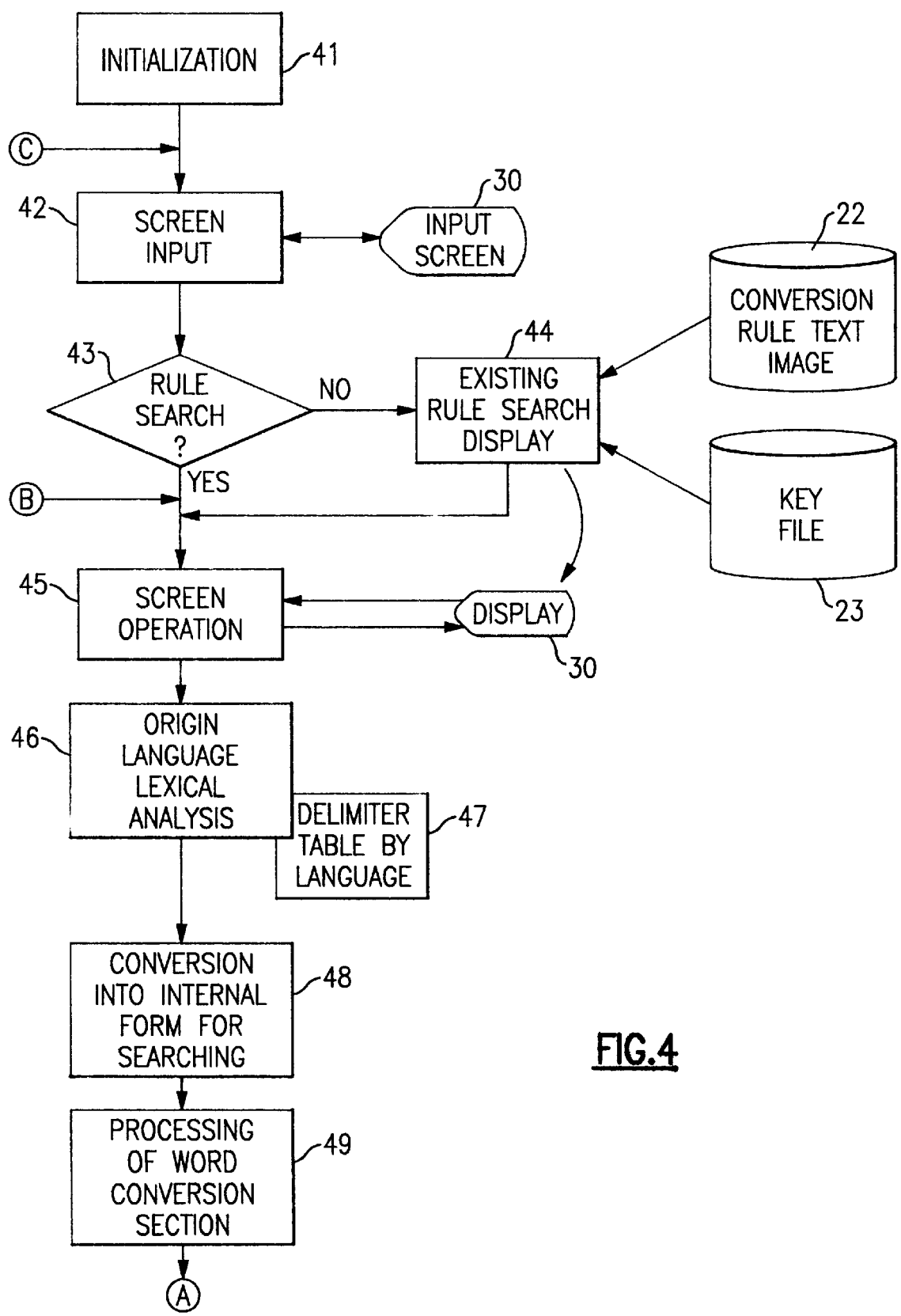
FIG. 4 is a flowchart showing the conversion rule generation procedure of this embodiment (part 1)
Figure 5:
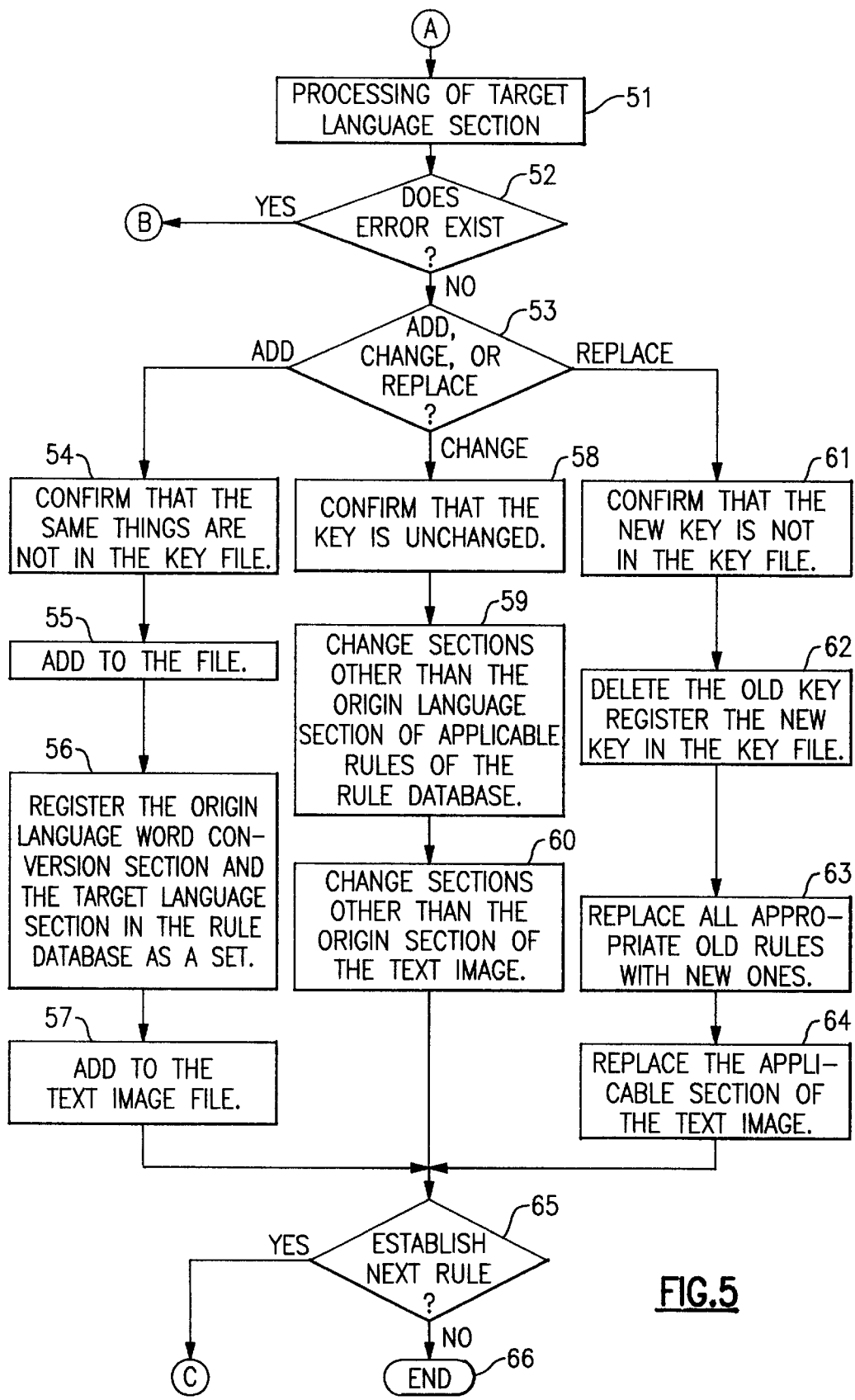
FIG. 5 is a flowchart showing the conversion rule generation procedure of this embodiment (part 2)

As an example, generation of a conversion rule to convert an IF statement, an instruction statement in FORTRAN, into an instruction statement having the corresponding function in COBOL is explained below. FIGS. 4 and 5 are flowcharts showing the conversion rule generation procedures of this embodiment. In initialization (block 41) in FIG. 4, the types of language subject to conversion, that is, the original language (FORTRAN) and the target language (COBOL) are specified on the initialization screen. In addition, original language specific delimiters and the like on description are specified as the need arises.

In screen input (block 42), operators input FORTRAN and COBOL model statements and the like, which are the basis for the establishment of conversion rules, on computer input screen 30 of the conversion rule input means 3. Instruction statements in the original language to be inputted by operators in original language input section 31 of screen 30 in FIG. 3 are modelled as follows. Instruction words that form instruction statements in the original language, words expressing functions, are displayed as they are. In the instruction statement, the portions corresponding to variables are expressed by character strings or characters to which an asterisk (*) is attached at the head.

The general form of an IF statements in FORTRAN is IF(A) N1, N2, N3. A stands for a relational expression. This IF statement means that statement number N1, N2, or N3 will be executed, according to the value of A (positive, zero, or negative). Assume that the statement numbers N1, N2, and N3 are 100, 200, and 300 respectively. If A<0, the IF statement gives an instruction to execute statement number 100. If A=0, the IF statement gives an instruction to execute statement number 200. And if A>0, the IF statement gives an instruction to execute statement number 300. In IF statements, A, N1, N2, and N3 correspond to variables expressed in different forms respectively, according to the content of the program. In this invention, these variables are called word sections. In IF statements, IF corresponds to an instruction word expressing the function of an instruction statement, and has a fixed form in the programs in the same language. Therefore, in this invention, the instruction word IF will be a key word section of a conversion rule.

In the original language input section 31 on screen 30 in FIG. 3, a statement in which an IF statement is modelled, that is, IF(*A) *N1, *N2, *N3, is inputted, in conformance with FORTRAN grammar. That is, the IF portion of the instruction word is used, as a key word. The word sections are expressed by characters or character strings in which an asterisk (*) is given at the head. Utilizing a unifying language, such as PROLOG, an appropriate conversion rule can be searched for by collating the conversion rule search key generated by the conversion model with the conversion rule search key for the original language program to be converted.

When a FORTRAN instruction statement, IF(A) 100, 200, 300, is described in a COBOL instruction statement having the same function as in FORTRAN, it will be IF A<0 PERFORM L100, IF A=0 PERFORM L200, IF A>0 PERFORM L300. The statement numbers in FORTRAN are expressed by numerals, but they correspond to labels in COBOL. Here, the COBOL label is a character string starting with a character from the alphabet.

In target language input section 33, instruction statements are described in the target language so as to be able to realize a function or an intended function (it might be desired to convert into a different function in some cases) that is the same as an instruction statement inputted in original language input section 31. To execute a function that is equal to the modelled instruction statement of FORTRAN, IF(*A) *N1, *N2, *N3, mentioned above in COBOL, the statements are described as follows in target language input section 33 on screen 30.

IF *A<0 PERFORM *XL1.

IF *A=0 PERFORM *XL2.

IF *A>0 PERFORM *XL3.

Here, *XL1, *XL2, and *XL3 are the modelled forms of element names that are created by converter 1 according to a conversion direction that is inputted in word conversion input section 32, to be explained later, and that can be used in COBOL.

The following inputting is carried out in word conversion input section 32. If the languages involved in conversion, the original language and target language, have different systems, the language components to be used are different. For example, the statement numbers in FORTRAN are expressed by numerals, but they correspond to labels in COBOL. The labels in COBOL are normally character strings starting with an alphabetic character. In addition, even if the languages are of the same system, reserved words expressing device names may differ. Therefore, the purpose of inputting into the word conversion input section 32 is for generating a PROLOG language predicate for calling the word conversion program or the word conversion table from the inputted information.

For example, a direction to word conversion input section 32, such as;

*N1 Label *XL1 means to convert a statement number in FORTRAN into a label with an alphabetic character in COBOL. This is, for example, transformed into a form called an "item," such as;

& table (Label, N1, XL1)

in PROLOG language by conversion rule generation means 2 described later. Here, when, for example, a statement number 100 is given to N1, a label in which the alphabetic character L is given at the head of 100, such as L100, is generated for XL1. Therefore, the following is inputted to word conversion input section 32.

*N1 Label *XL1

*N2 Label *XL2

*N3 Label *XL3

Next, whether to establish a new conversion rule using the program function key 34 or to use the existing conversion rule by modifying it is directed on the screen 30 in FIG. 3. If the existing conversion rule is used by modifying it, conversion rule search key file 23 is searched for the same conversion rule as that inputted on screen 30 in FIG. 3 or a similar conversion rule (block 43), and an appropriate conversion rule is read from conversion rule text image file 22 and displayed on screen 30 (block 44).

In screen operation (block 45), operators create, modify, and edit the conversion rule on screen 30 in FIG. 3, and direct measures for the latter by program function keys 34. These directions include add, delete, change, and replace.

The contents inputted into original language input section 31, word conversion input section 32, and target language input section 33 on input screen 30 of conversion model input means in FIG. 3 are processed by conversion rule generation means 2 to generate a conversion rule.

First, in the lexical analysis of the original language (block 46), the model statements in the original language that are inputted into the original language input section 31 are decomposed into variable and key word elements while referring to delimiter table 47 by language or by instruction statement that is specified on the initialization screen (block 41).

In conversion into the internal form for searching (block 48), the elements that have already been decomposed are converted into an internal form for searching so that they can later be used as search keys in conversion rule drive means 9. That is, the model statements in the original language are converted into keys that will be used for searching for conversion rules in later conversion of the original program. At this time, the key creation method can be changed so that it matches the search method in conversion rule drive means 9. For example, even if the word orders of key words used are different, if it is desired to treat them as the same key, flexible collation can be performed by giving key words that are rearranged in ascending order or in descending order as a sub-key.

For example, a model statement that is inputted in the original language input section 31, such as;

IF(*A) *N1, *N2, *N3 is converted into an internal form for searching by conversion rule generation means 2, such as;

convert (["IF", ("(", A, ")", N1, ",", N2, ",", N3])

This internal form for searching, expressed by "convert ( . . . )" is placed in the first line of the conversion rule so that it can be used as a conversion rule search key. When conversion rule drive means 9 searches for and fetches a necessary conversion rule, this search key is used for the purpose of collating whether the conversion rule is necessary or not.

In the word conversion input section 32 (block 49), the following process is carried out. If the languages involved in conversion have different language systems, the language components to be used are different. Therefore, in the process of word conversion, a PROLOG language predicate for calling a word conversion program that performs word conversion or a word conversion table is generated from the inputted information. For example, a direction to word conversion input section 32, such as;

*N1 Label *XL1 means to convert a statement number in FORTRAN into a label with an alphabetic character in COBOL. This is, transformed into a form called an "item," such as;

& table (label, N1, XL1)

in PROLOG language. When, for example, statement number 100 is given to N1, a label in which the alphabetic character L is given at the head of the number 100, such as L100, is generated for XL1.

Therefore, word conversion input section 32 is converted into PROLOG language predicates as a word conversion direction section for calling a word conversion program or a word conversion table, such as the following.

←table (label, N1, XL1)

& table (label, N2, XL2)

& table (label, N3, XL3)

These lines are placed next to the conversion rule search key expressed by "convert ( . . . )" that is mentioned above in the conversion rule.

In the target language input section (block 51), the model statements that are inputted in the target language input section 33 are analyzed lexically and converted into a form enabling generation of the target language when conversion rules are taken out and processed in conversion rule drive means 9. At this time, since the variables used in the target language section are defined in the original language section or in the word conversion section, error checking is also carried out so that errors due to variables not yet defined are not encountered when the target language is generated.

For example,

IF *A<0 PERFORM *XL1.

mentioned above is converted into the form of

&Z1:='IF'‖A‖'<0 PERFORM'‖XL1‖'.'

This means to generate

IF X<0 PERFORM L100.

by jointly operating on the information (*A is X) obtained from the character string enclosed by quotation marks in the original language section and the information (XL1 is L100) obtained from the word conversion section at the time of execution by conversion rule drive means 9. Therefore, in the process of the target language section, a target language generation program such as the following is generated by conversion rule generation means 2 and placed next to the word conversion direction section.

&Z1:='IF'‖A‖'<0 PERFORM'‖XL1‖'.'

&Z2:='IF'‖A‖'<0 PERFORM'‖XL1‖'.'

&Z3:='IF'‖A‖'<0 PERFORM'‖XL1‖'.'

&prst (Z1, out) & n1 (out)

&prst (Z2, out) & n1 (out)

&prst (Z3, out) & n1 (out)

As explained above, a conversion rule search key created from the input of the original language input section 31, a word conversion direction section created from the input of word conversion input section 32, and a target language generation program created from the input of the target language input section 33 as a set constitute conversion rule 99, such as shown in FIG. 15. Conversion rule 99 converts an IF statement in FORTRAN into an instruction statement in COBOL having the same function.

If there is an error in the process mentioned above, the section with the error is indicated to the operator and correction is required (block 52).

Figure 6:
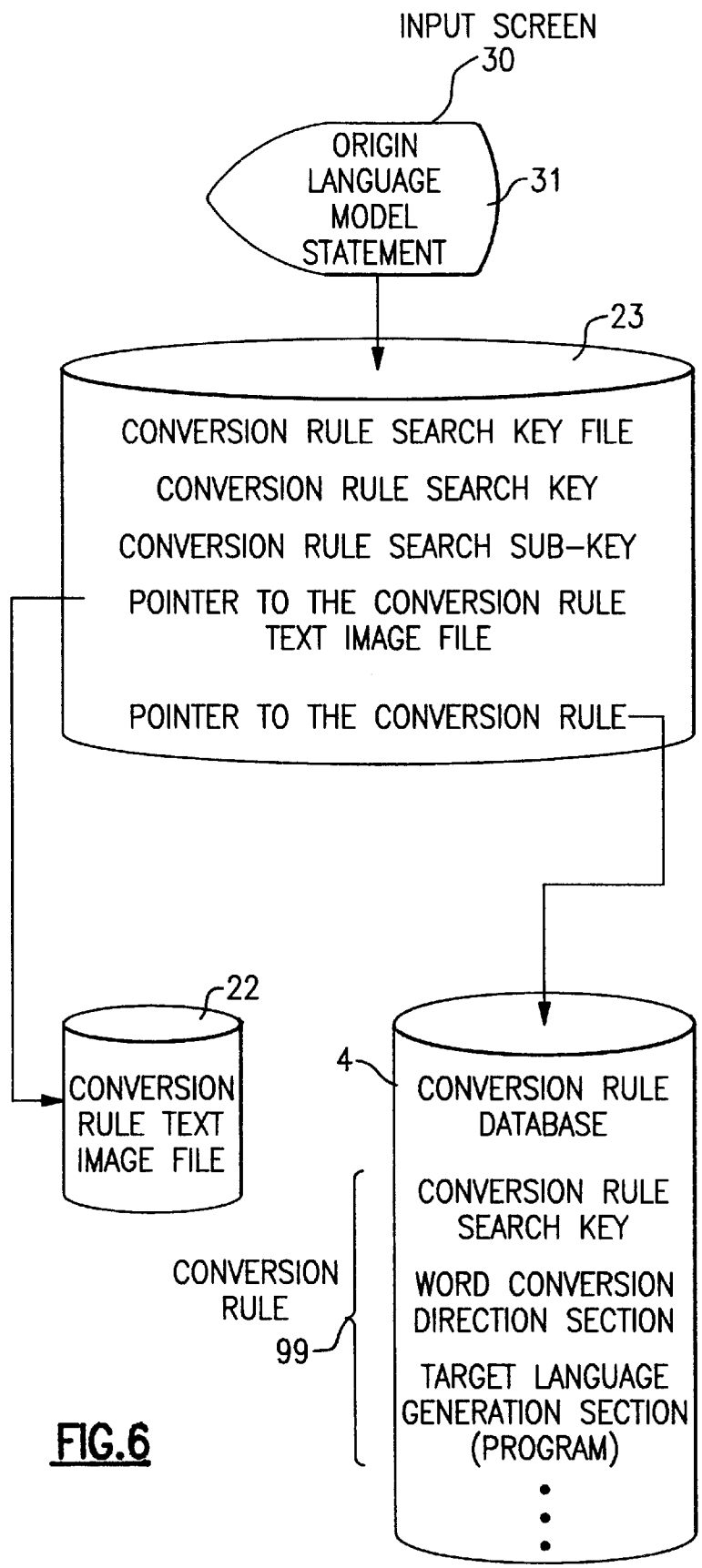
FIG. 6 is a schematic block diagram showing the files associated with the conversion rules.

When there are no more errors on the conversion rule establishment screen, the user gives a direction, such as add, change, and replace the conversion rule 99 (block 53). The processing at this time is explained by referring to FIGS. 5, 6, and 15 together. If a direction for addition is given, it is confirmed that the same conversion rule 99 is not already in the conversion rule search key file 23 (block 54). Next, the conversion rule search key, conversion rule search sub-key, pointer to conversion rule text image file 22, and pointer to conversion rule database 4, which are created by the above process, are stored in conversion rule search key file 23 (block 55). Then, a conversion rule (a set consisting of a conversion rule search key, word conversion direction section, and target language generation section) 99 is stored in conversion rule database 4 (block 56). In this way, a conversion rule database 4 is constructed. Next, the contents of conversion rule input screen 30 at the time when this conversion rule 99 is established are stored in conversion rule text image file 22 so that it can be easily displayed again on the screen for later maintenance of conversion rule 99 (block 57).

If a direction for change is given, it is confirmed that conversion rule search key of conversion rule 99 is unchanged (block 58). The section other than conversion rule search key of the applicable conversion rule in conversion rule database 4 is changed into new conversion rule (block 59). Then, the section other than the original language input section in text image file 22 is changed (block 60).

If a direction for replacement is given, it is confirmed that there is no new conversion rule search key for conversion rule 99 is in key file 23 (block 61). The old search key in key file 23 is deleted and a new search key is registered (block 62). All the applicable old conversion rules in conversion rule database 4 are replaced with new ones (block 63). Then, the applicable old section in text image file 22 is replaced with a new one (block 64). If there is another conversion rule to be established, the same processing is repeated (block 65). If there is no more conversion rule establishment, the process ends (block 66).

In the conversion rule establishment explained above, the associated files, as shown in FIG. 6, are created based on the conversion rule search key that is generated by analyzing the model statements in the original language. That is, the original language model statement 31 is a conversion rule search key. Conversion rule database 4, conversion rule search key file 23, and conversion rule text image file 22 are constructed based on this key.

The conversion rule generation mentioned above is explained below. FIG. 8 shows some statements of an unconverted original program 80. Statement 81 in the program is an IF statement in FORTRAN as mentioned above. FIG. 9 shows some corresponding statements of a converted target program. Statements 91 are instruction statements in COBOL, which are equivalent to the one in FORTRAN, into which the IF statement 81 in FORTRAN is converted. FIG. 10 shows examples of word conversion rules and model statements of the original language and target language that are inputted on conversion rule input screen 30 by the operator when a conversion rule to convert original program 81 in FIG. 8 into instruction statements 91 in COBOL having a corresponding function in target program 90 in FIG. 9. FIG. 15 shows conversion rule 99 that is generated from the input in FIG. 10 by conversion rule generation means 2 to convert IF statement 81 in FORTRAN mentioned above into instruction statements 91 in COBOL having the same function. Conversion rule 99 consists of a set of a conversion rule search keys that are generated from the original language input section, a word conversion direction section that is generated from the word conversion input section, and a target language generation program that is generated from the target language input section. Conversion rule 99 is stored in conversion rule database 4.

Figure 7:
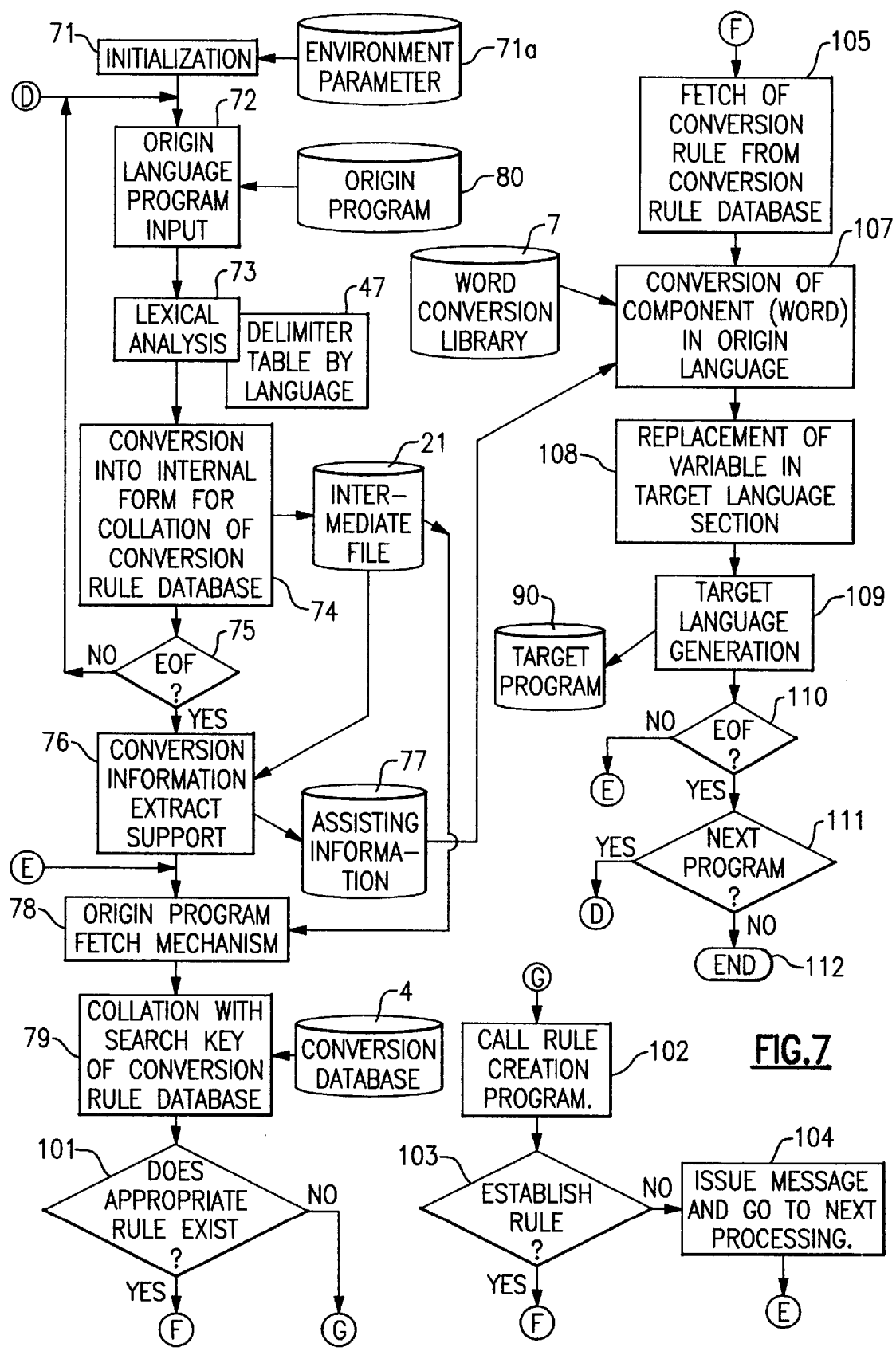
FIG. 7 is a flowchart showing the programming language conversion procedure.

Next, a method to convert original program 80 into target program 90 using conversion rule 99 that is generated in this way is explained by referring to FIG. 7.

As shown in FIG. 7, when original program 80 is converted into target program 90, operation environment parameters 71a are set up in the initialization process and the types of languages that are involved in conversion are specified (block 71). In original language program input, original language program 80 for each record is read from the input device specified in the initialization process (block 72). If a conversion unit statement in original language program 80 is divided into two records or more, a plurality of records are reconstructed in the conversion unit statement in original language program input 8. Comment lines or comments in original program 80 are stored separately for later output. Then, the conversion unit statement is transferred to the following processing.

Lexical analysis of the conversion unit statement is carried out (block 73). In lexical analysis, each conversion unit is decomposed into com ponents by referring to language delimiter table 47 by using the same lexical analysis feature as that in creating a conversion rule explained in FIG. 4. For example, in instruction statement 81, an IF statement in FORTRAN in the original program 80 shown in FIG. 8;

IF(X) 100, 200, 300

The following components are decomposed and analyzed.

[IF], [ᴸ(], [X], [)], [100], [,], [200], [,], [300]

In the following internal form conversion for collation (block 74), these decomposed components are converted into an internal form so that they can be easily collated with the conversion rule search key (Refer to the first line in FIG. 15), and are stored in intermediate file 21 or in a storage device. For example, in the case of the IF statement mentioned above, intermediate file 21 has a form shown in line 21a in FIG. 21. The lexical analysis feature (block 73) and the internal form conversion feature for collation (block 74) repeat the operation mentioned above until the reading of one file of original program 80 is completed (block 75).

In the conversion assistance information extract support feature (block 76), language conversion is carried out sequentially from the initial record, but if the information before and after an instruction statement in the conversion process is referred to, the conversion efficiency can be increased. Here, it is made possible to fetch information from a conversion rule collation key that is stored in intermediate file 21 that has been created in advance. For example, this may be information on variables of components that are used for arithmetic operations or character operations. Since the needed information varies depending on the languages involved in conversion, an interface to conversion assistance information file 77 is provided.

The original language program fetch feature (block 78) fetches original program 80 that has been converted from intermediate file 21 into conversion rule collation key form (line 21a in FIG. 21). At this time, the conversion unit statements for the numbers, given to characteristic information of conversion rule database 4, are fetched and transferred to the conversion rule database collation feature (block 79).

Figure 23:
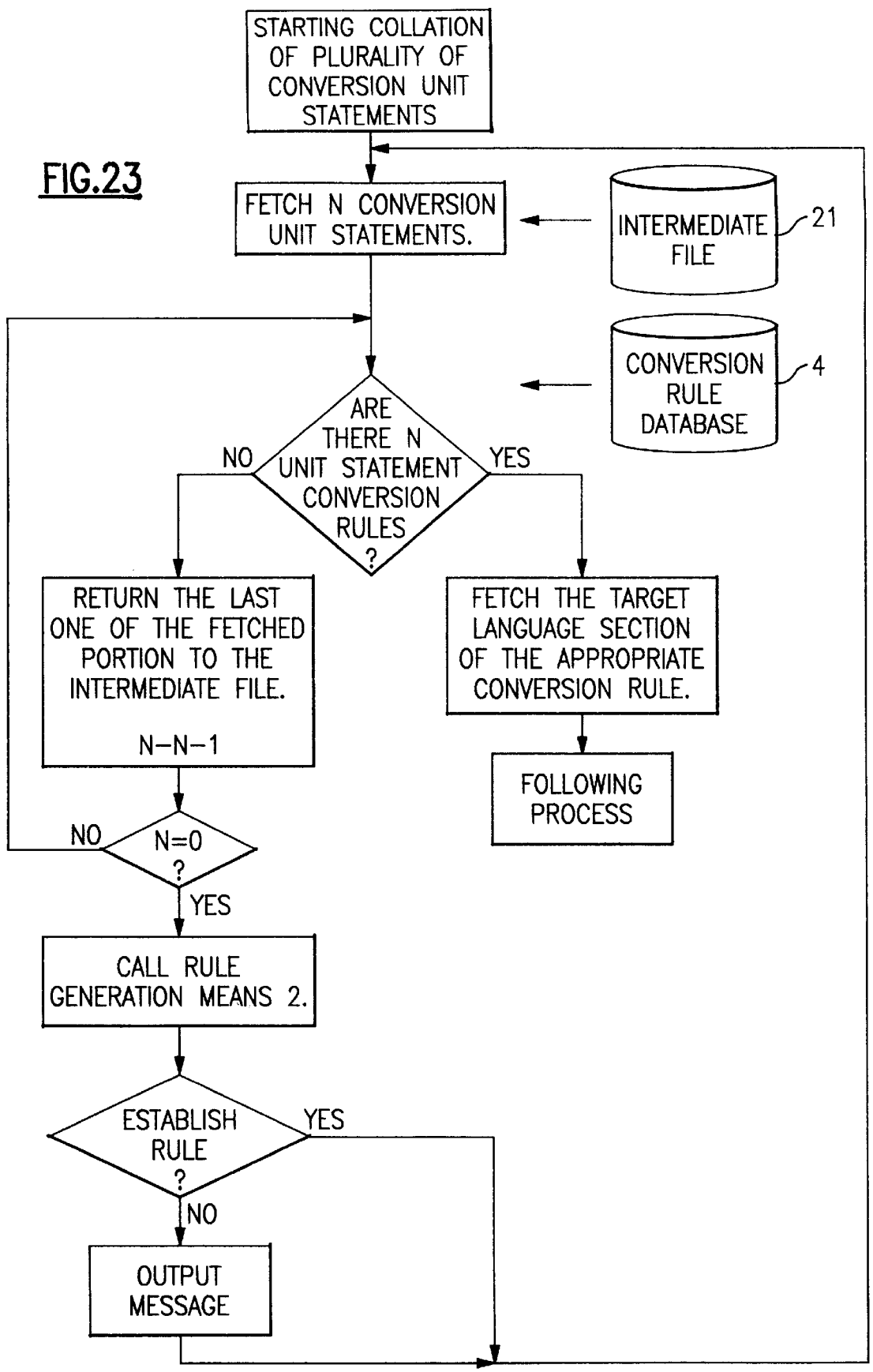
FIG. 23 is a flowchart showing the collation and fetch procedures of a plurality of conversion unit statements and conversion rules.

In conversion rule database collation feature (block 79), original program 80 that is stored in intermediate file 21 is converted into conversion rule collation key form (line 21a in FIG. 21). A search key (the first line in FIG. 15) of conversion rule 99, which is stored in conversion rule database 4 and conversion rule search key file 23, is generated by conversion rule generation means 2 and is formed of key words and variables. For the collation of the search key, among the components in the conversion rule collation key form, conversion rule database 4 is searched for a conversion rule search key having the same key words and arranged in the same order and having the same number of variables as that of the components other than the key words. If the positional relation between the key words and the component other than them is the same, it is considered that an appropriate rule exists and the conversion is started according to that conversion rule. The search for this conversion rule search key is carried out by using the search key in key file 23. And if an appropriate search key is found, corresponding conversion rule 99 is fetched by using the pointer to corresponding conversion rule 99 in conversion rule database 4 that is stored in key file 23 (Refer to FIG. 6). When a conversion rule is searched for, a plurality of conversion unit statements are collated in some cases. The flowchart of this is as shown in FIG. 23.

If an appropriate conversion rule does not exist in conversion rule database 4 (G in block 101), a message is issued and the creation of a new conversion rule for this is requested of the operator (block 102). The operator gives a direction as to whether to establish a new rule or to carry out establishment later (block 103). If a new rule is established, conversion is carried out according to this rule (F of block 103). If a rule is not established, a message indicating that the conversion could not be carried out is issued and the operator goes to the next process step (block 104).

When an appropriate conversion rule is found (F of block 101), conversion rule 99 is fetched from conversion rule database 4, the word conversion direction section and the target language generation program are incidentally fetched from conversion rule 99 (Refer to FIG. 15) (block 105), and word conversion and target language generation are carried out. The execution of target language generation is first carried out from the calling of word conversion library 7 and conversion of words even though this depends on the specification of conversion rule 99 (block 107). The variable section of the target language generation program is replaced with converted words (block 108). Target program 90 of the target language is generated by target language generation program (block 109) and this is outputted to the specified output device, from target language output section 10. At this time, comment lines or comments that were separated out at the time of input and stored separately are called and outputted when the need arises.

If the original program (IF statement in FORTRAN, 81 in FIG. 8) of this embodiment is converted into COBOL (target program 91 in FIG. 9), word conversion table 7 in FIG. 20 which is stored in word conversion library 7 is fetched from the word conversion direction section of conversion rule 99 (FIG. 15) that is fetched in block 105. Statement number 100 in FORTRAN is converted to label L100 in COBOL (blocks 107 and 108). Then, the target language generation program of conversion rule 99 (FIG. 15) generates instruction statements 91 of the target program in FIG. 9 by jointly operating on the information (*A is X) obtained from the character strings enclosed with quotation marks ('') and the original language section and the information (XL1 is L100, etc.) obtained from the word conversion section.

The word conversion table and word conversion logic 7 shown in FIG. 20 are such that they are to be created and registered by word conversion table input 6 by word conversion table creation means 5 using the original language to be converted and the target language separately, as the need arises.

In this way, the conversion of one original program 80 ends (block 110), and if there is no other conversion of the original program (block 111) to be performed, the program language conversion process ends (block 112).

FIG. 22 shows the main part of an example of a conversion rule drive program 100 of conversion rule drive means 9 for the actual execution of the program language conversion process shown in FIG. 7 as explained above. Conversion rule drive program 100 fetches internal form 21a of original program 81 that is stored in intermediate file 21 in FIG. 21 sequentially with data (M, List)

which calls an appropriate conversion rule 99 (FIG. 15) with convert (List)

and generates target program 91 shown in FIG. 9 as mentioned above. As understood from the above, conversion rule drive program 100 has a form that does not depend on either the original language or the target language of the languages involved in conversion.

Next, another conversion example according to this embodiment is explained by taking the original program 80 to be as shown in FIG. 8 as an example.

There is a desire in some cases to convert a plurality of instruction statements of an original program as a set into a target program. For example, when the character strings defined as;

DATA HEAD(1)/'HEAD1'/

DATA HEAD(2)/'HEAD2'/

DATA HEAD(3)/'HEAD3'/ in FORTRAN are moved to another different area TITLE, they are described like the following one set of instruction statements shown in original program 82 in FIG. 8;

TITLE(1)=HEAD(1)

TITLE(2)=HEAD(2)

TITLE(3)=HEAD(3)

When this is converted into COBOL, a conversion rule for converting them as if they are one instruction statement like;

MOVE HEAD TO TITLE shown in target program 92 in FIG. 9 is established as follows.

In cases when a model statement is inputted to conversion rule input screen 30 and it is desired to convert a plurality of instruction statements as a set, if an exclamation mark (!) is attached to the head of each model instruction statement of the original language input section as shown in FIG. 11, these can be dealt with as a group. That is, they are described as follows:

Original language input section

!*TO(*I)=*FROM(*I)

!*TO(*J)=*FROM(*J)

!*TO(*K)=*FROM(*K)

Target language input section

MOVE *COBOLY TO *COBOLX

These are converted and stored into conversion rule search key of the conversion rule 99 shown in FIG. 16 in such a form that can be collated with a plurality of statements in the original language by conversion rule generation means 2.

In the word conversion input section, as an example comprises the following instruction statements in FORTRAN mentioned above;

!*TO(*I)=*FROM(*I)

!*TO(*J)=*FROM(*J)

!*TO(*K)=*FROM(*K)

are converted into a COBOL instruction statement as follows:

MOVE *COBOLY TO *COBOLX the *I, *J, and *K values must be in succession. In such a case, for example, the following;

*I relation *J

*J relation *K

*TO name *COBOLX

*FROM name *COBOLY is directed in the word conversion input section. This generates the word conversion direction section of conversion rule 99 as shown in FIG. 16 by conversion rule generation means 2. Although this is converted into a form of "item" such as;

& table (relation, *I, *J)

& table (relation, *J, *K)

this has a function to go on with the process only if the relation of:

*J=*I+1 or *K=*J+1 is formed.

FIG. 20 includes word conversion tables that carry out word conversion according to the word conversion direction section of conversion rule 99 in FIG. 16. In 21b in FIG. 21, an example where the original program 82 in FIG. 8 is converted into an intermediate file 21 is shown.

The other original programs 83, 84, and 85 shown in FIG. 8 are written in event driven language (EDL) that is used for the IBM Series/1 computer. To convert these into the target programs 93, 94, and 95 that are written in C language shown in FIG. 9, the model statements in the original language and target language and the word conversion rules such as shown in FIGS. 12, 13, and 14 must be inputted into the conversion rule input screen.

Figure 18:
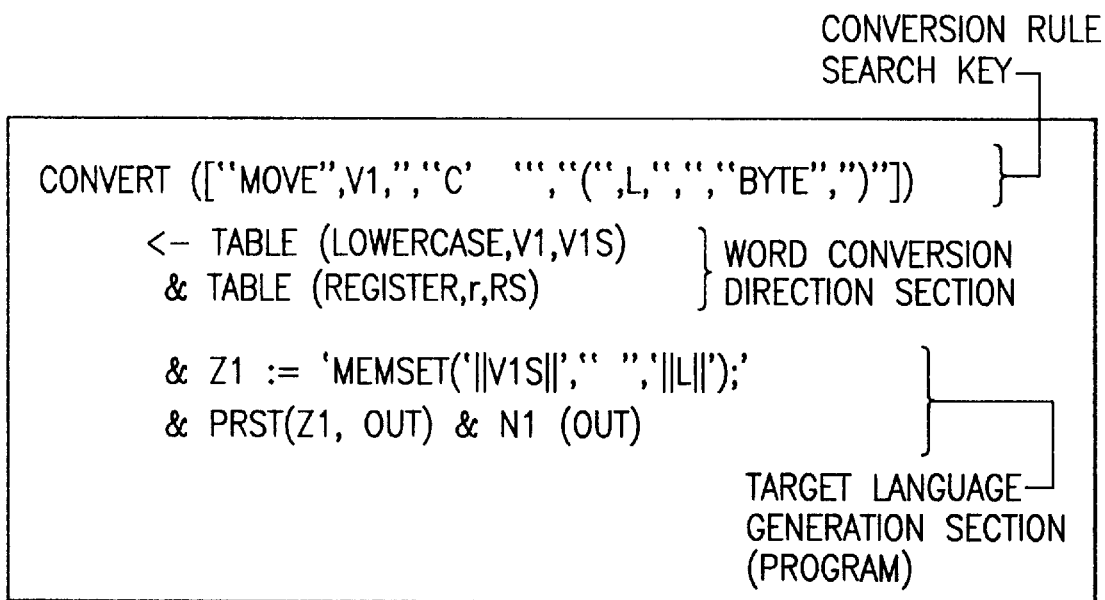
FIG. 18 is a drawing also showing an example of a conversion rule.
Figure 19:
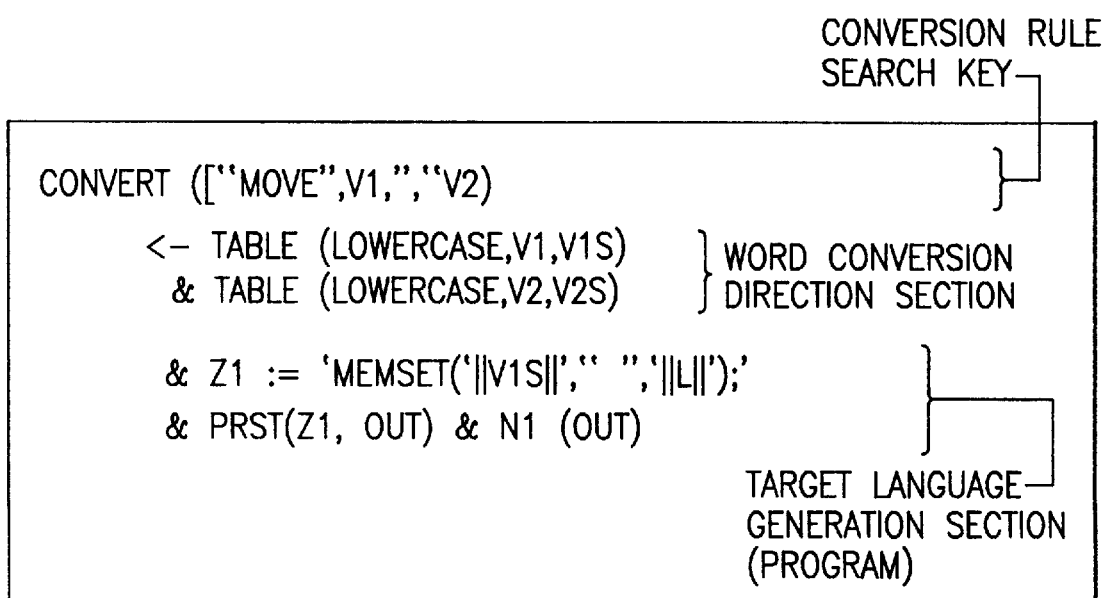
FIG. 19 is a drawing showing still another example of a conversion rule.

Conversion rules 99 are generated as shown in FIGS. 17, 18, and 19 respectively by conversion rule generation means 2 according to the inputs into the conversion rule input screens in FIGS. 12, 13, and 14. FIG. 20 shows a word conversion table that is used by the word conversion direction section of conversion rule 99 at the time of word conversion.

Originer programs 83, 84, and 85 shown in FIG. 8 are first converted into the forms of intermediate files 21c, 21d, and 21e as shown in FIG. 21 respectively, and are then converted into target programs 93, 94, and 95 shown in FIG. 9 respectively by conversion rules 99 shown in FIGS. 17, 18, and 19 fetched from conversion rule drive program 100 shown in FIG. 22.

According to this invention, programming languages can be converted by inputting model statements in an original language, model statements in a target language, and conversion rules for the word (variable) sections by using a conversion rule input means, by establishing conversion rules by using a conversion rule generation means according to this input, and by storing them in a conversion rule database. In this way, any programmer of the original language can describe model statements in the original language at the original section and input these by using a conversion rule input means. In addition, if the functions of these model statements are understood, programmers of the target language can describe them in model statements in the target language, and these can be inputted by a conversion rule input means together with the conversion rules for the word sections. Therefore, conversion rules in which the word sections can be converted independently can be generated simultaneously with the conversion rules for the instruction statements. In addition, as understood from the above explanation, a conversion rule input means, a conversion rule generation means, and a conversion rule drive means, which are the main sections of a programming language converter of this invention, do not depend on the types of conversion languages involved. Therefore, a programming language converter of high versatility can be provided. Since the variables of the programming languages can be converted separately from the key words expressing functions according to the device and method for converting programming languages of this invention, its versatility can be increased. Furthermore, since the device and method for converting programming languages of this invention stores part of the conversion rules as independent files for maintenance, it is superior in terms of conversion rule maintenance.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What I claim is:

1. A method that converts a computer program written in an original language, which is one computer language, into a target program written in a target computer language, which is different from the original computer language, said method comprising the steps of:
    inputting a conversion model having instruction statements in said original language and instruction statements in said target language which are equivalent in function to said instruction statements in said original language,
    generating conversion rules from said inputted conversion model;
    inputting said original program; and
    locating the appropriate conversion rules corresponding to said inputted original program and converting said original program into said target program according to the content of the located conversion rules.

2. The method of claim 1 in which, in the step of inputting said conversion model, said original language and said target language instruction statements include key word sections expressing functions and also include word sections expressing variables.

3. The method of claim 2 in which, in the step of inputting said conversion model, a direction for conversion between word sections in said original language and said target language is also inputted.

4. The method of claim 3 in which, in the step of generating said conversion rules, a search key is generated from said inputted original language instruction statement and is used for searching for said conversion rules, a target language generation means is generated that is used for generating said target program from said inputted original program, and a word conversion direction means is generated that converts said word section in said original language into said word section in said target language according to said conversion means.

5. A device that converts a computer program written in an original computer language into a target program written in a target computer language, which is different from the original computer language, said device comprising:
    a conversion rule input means which produces a conversion model created by inputting statements in said original language, and inputting the functional equivalent of said original language statements in said target language;
    a conversion rule generation means for generating conversion rules from said conversion model;
    an original program input means for inputting statements from said original program; and
    a conversion rule drive means which locates conversion rules corresponding to said inputted original program statements and converts said original program into said target program according to the content of located conversion rules.

6. The device as set forth in claim 5 wherein said conversion model includes a key word section expressing functions and a word section expressing variables, both in said original language and in said target language.

7. The device as set forth in claim 6 wherein said word section receives directions for conversion between word sections in said original language and word sections in said target language through said conversion rule input means.

8. The device as set forth in claim 7 wherein said conversion rule generation means creates at least one conversion rule, said conversion rule generation means comprising:
    a search key which is used to locate said conversion rule;
    a target language generation program in a unifying computer programming language which is different from said original language and from said target language;
    a word conversion direction section which utilizes said unifying computer programming language to provide directions which convert said word section in said original language into said word section in said target language.

9. The device as set forth in claim 8 wherein said word conversion direction section utilizes a plurality of word conversion tables to convert said word section in said original language into said word section in said target language according to said directions.

10. The device as set forth in claim 9 wherein said original program input means also converts said original program into an intermediate form, by use of lexical analysis, after said original program has been inputted, that contains a conversion rule collation key and wherein said conversion rule drive means searches for said conversion rules by conducting a positional analysis between said conversion rule collation key and said search key.

11. The device as set forth in claim 5 wherein said conversion rule input means, said conversion rule generation means, and said conversion rule drive means do not depend on said original language and said target language.

12. The device as set forth in claim 5 wherein each said conversion rule relates a plurality of said model statements of said original language with one model statement and converts a plurality of instruction statements of said original program into one instruction statement of said target program.

13. The device as set forth in claim 6 having a search key file storing said search keys of said conversion rules and using said search key file for modification of said conversion rules.

14. The device as set forth in claim 8 in which said conversion model is inputted by said conversion rule input means as an independent conversion rule text image file for later modification of said conversion rules.

15. A device that converts a computer program written in an original language into a target program written in a target language, which is different from the original computer language, said device comprising:

- a conversion rule input means having an original language input section that receives instruction statements, in said original language, that are classified into key word sections expressing functions and word sections expressing variables according to an original computer language grammar, a target language input section that inputs instruction statements in said target language which are equivalent in function to said instruction statements in the original language which are classified into key word sections expressing functions and word sections expressing variables according to said target language grammar, and a word conversion input section that inputs rules for conversion between said word sections in said original language and said word sections in said target language;
- a conversion rule generation means that generates conversion rules that include a conversion rule search key generated from said original language input section, a word conversion means generated from said word conversion input section, and a target language creation means generated from said target language input section;
- a conversion rule database that stores said conversion rules;
- an original language input means that inputs said original program; and
- a conversion rule drive means that fetches said conversion rules corresponding to said inputted original program from said conversion rule database by using said conversion rule search key, that carries out word conversion by using the fetched word conversion means of said conversion rules, that creates instruction statements in said target program by using said target language creation means of the fetched conversion rules, and that outputs said target program instruction statements.

* * * * *